United States Patent [19]

Hilgers et al.

[11] Patent Number: 4,940,606

[45] Date of Patent: Jul. 10, 1990

[54] METHOD OF INCREASING THE LUBRICANT RETENTION OF MAGNETIC DISKS

[75] Inventors: Heinz Hilgers, Mainz; Rainer Morbitzer, Mainz-Kostheim; Johannes Windeln, Bodenheim, all of Fed. Rep. of Germany

[73] Assignee: International Business Machines Corporation, Armonk, N.Y.

[21] Appl. No.: 456,758

[22] Filed: Dec. 26, 1989

[30] Foreign Application Priority Data

Dec. 24, 1988 [EP] European Pat. Off. ........ 88121667.5

[51] Int. Cl.$^5$ ........................ H01F 10/02; B05D 5/12
[52] U.S. Cl. .................................... 427/130; 427/131; 427/374.3; 427/380; 427/384; 428/694; 428/695; 428/900
[58] Field of Search .................... 427/130, 131, 374.3, 427/380, 384; 428/694, 695, 900

Primary Examiner—Bernard Pianalto

Attorney, Agent, or Firm—Thomas R. Berthold

[57] ABSTRACT

The invention concerns a method of increasing the lubricant retention of a magnetic layer, wherein a magnetic layer, containing magnetic particles dispersed in a curable organic binder system and organic solvents and an additive, is cured in a two-step process, wherein the magnetic layer, in a first step, is heated in an inert gas for a given time to a given temperature and, in a second step, in an inert gas to which oxygen has been added, for a given time to a given temperature. According to a preferred embodiment of the invention, the magnetic layer with polyvinyl methyl ether (PVME) as an additive is heated in nitrogen for 2.5 hours to 234° C. and, after cooling down, in a nitrogen atmosphere containing 30 vol % oxygen for 60 minutes to 234° C. In the first step, this kind of curing leads to polymerization of the binder and phase separation of PVME and in the second step of oxidation of PVME, forming a plurality of pores in the magnetic layer.

11 Claims, No Drawings

METHOD OF INCREASING THE LUBRICANT RETENTION OF MAGNETIC DISKS

BACKGROUND OF THE INVENTION

The invention concerns a method of increasing the lubricant retention of coatings of magnetic disks containing an organic binder system and magnetic particles.

A magnetic recording medium such as a magnetic disk consists as a rule of an aluminum substrate on which is deposited a magnetic layer containing a duroplastic or thermoplastic organic binder system and magnetic particles, such as iron oxide particles. The coating formulation containing the organic binder system and the magnetic particles dispersed in organic solvents is applied with a given layer thickness and cured to obtain a tough and durable film. During operation, the magnetic disk rotates at a constant rate, while the magnetic head flys over the magnetic disk surface at a given height. Also during operation, in particular in the start and end phases, there may be head/disk interaction leading to wear of the magnetic disk and reducing its life.

To avoid disk damage resulting from such head/disk interaction, the magnetic disk was previously provided with a lubricant. It has also been proposed (IBM Technical Disclosure Bulletin, Vol. 26, No. 9, February 1984, p. 4455, M. R. Lorenz et al., "CONTROLLED PORE FORMATION IN MAGNETIC DISK COATINGS TO OPTIMIZE LUBRICANT RETENTION") to add to the coating formulation particulate matter that has the property of forming voids and that is insoluble therein. For example, polyacetal particles can be discretely distributed in the coating. During curing at elevated temperatures, these particles revert to monomers which evaporate, leaving behind the desired voids. By controlling the concentration and size of the particles, the concentration and size of the voids and thus the disk's liquid lubricant retention can be manipulated.

It is known (U.S. Pat. No. 4,546,035) that the lubricant retention can be attributed to two separate processes: retention of lubricant within microroughnesses near the surface of a disk, and retention of lubricant in microvoids distributed throughout some thickness of the coating. It has been found that the retention of lubricant attributed to the surface process is fairly constant as a function of different disk coating formulations, while that attributed to the microvoid process varies from coating batch to coating batch.

It has also been found that this variance of lubricant retention as a function of microvoid density occurs as a result of different levels of phase separation of an organic constituent of the coating plus different levels of oxidative degradation volatilization during cure. U.S. Pat. No. 4,546,035 mentions the use in a magnetic coating of a number of polymeric additives which, due to their ability to phase separate and their inherently lower thermal oxidative stability in relation to the magnetic coating binder system, result in additional microvoid formation from the same process ascribed to the current thermal oxidative degration volatilization mechanism. In addition to their utility in microvoid formation, these additives produce increased durability of the magnetic coating. These additives are degraded during curing and, if desired, volatilized up to 100%. Polyvinyl methyl ether, which is also degraded during curing, without 100 percent volatilization, is not believed to contribute to void formation to the same extent as the additives provided in the U.S. Patent.

Oxidative processes during curing have never been tested to the effect of varying the oxygen content of the atmosphere to which the magnetic disks are exposed during curing. However, tests with varying oxygen content are of fundamental interest to all coating formulations for particulate magnetic disks.

SUMMARY OF THE INVENTION

Therefore, it is the object of the invention to provide a method of curing magnetic disks, wherein the oxygen content in the oven atmosphere is varied during curing.

This object according to the invention is accomplished by a method as claimed in claim 1.

According to the invention, the magnetic coating of the disk containing an additive is cured in a first step in an inert gas and in a second step in an inert gas atmosphere with varying oxygen contents. This kind of curing drastically increases the lubricant retention of the magnetic layer.

The invention is explained in detail below in the following description.

DESCRIPTION OF THE PREFERRED EMBODIMENTS

During the production process of magnetic disks, a dispersion of magnetic particles in a binder system and solvents and, if necessary, different additives (coating formulation) is applied to an aluminum substrate and uniformly distributed on the disk substrate by being spun off. Suitable binders are, for example, phenol novolak resins, epoxy resins, polyurethane resins or polyester resins, whereas suitable solvents are, for example, ethylamylketone, isophorone, xylene, toluene or mixtures thereof. The mixture of 22 vol % ethylamylketone, 54 vol % isophorone, 22 vol % xylene and 2 vol % toluene according to the invention is particularly advantageous. The porosity in the cured coating is produced by additives such as polyvinyl methyl ether (PVME). Also suitable for pore formation are polymeric additives as described in the aforementioned U.S. patent.

The coated disk substrates are then heated in a drying oven to a predetermined temperature. During this curing process, the coating is made mechanically resistant, while a predetermined porosity for lubricant retention is produced in the surface region. The mechanism of pore or void formation in the surface region of the magnetic disk is described by means of the function of a polyvinyl methyl ether (PVME) additive. The polymeric PVME in the coating formulation is compatible with the resin raw materials and the solvents prior to being heated in the drying oven. During curing at, for example, 234° C., the resin raw materials start to polymerize, forming another environment with which the PVME is incompatible. This leads to phase separation of the PVME in the resin matrix. A competing reaction occurs if oxygen is present in the oven atmosphere. The PVME is partly destroyed, i.e., degraded, at elevated temperatures, and the phase separated, degraded PVME leaves pores for lubricant retention.

Previously, the curing processes were carried out in an air oven atmosphere. During such processes, the lubricant retention of the coating formulation could be controlled only as a function of the amount of PVME added. The addition of a greater amount of PVME, although being desirable for enhanced lubricant retention, adversely affects the properties of the magnetic disk coating, since the PVME does not only act as a pore former but also interferes with the curing reaction of the coating formulation, causing drastic changes in the softening temperatures of the magnetic disk coatings. In addition, it adversely affects the polishing behavior of the magnetic disk surfaces, impairing the mechanical strength of the magnetic disk coatings. Therefore, a curing process is desirable which does not require an increased PVME content of the magnetic disk coating, but which nevertheless permits retaining a quantity of lubricant that is twice as high as that previously afforded by magnetic disk coatings. This means that while maintaining the lubricant retention, the content of PVME may be reduced by about 50%. This reduction of PVME is highly desirable, since it considerably increases the mechanical strength of the magnetic layer.

The parameters of the two-step curing process are given below. "Content of solids" denotes the weight of all solids contained in the coating formulation. This weight is determined by thermal gravimetric analysis, evaporating the solvent at a curing temperature of 230° C. For this purpose, nitrogen is used as an inert gas to retain the PVME in the resin matrix. Pigment volume concentration is the percent by volume pigment content of the coating formulation. The latter value is also determined by thermal gravimetric analysis (TGA) at temperatures >600° C., using oxygen to burn up any organic constituents. The inorganic pigment residue is then converted to pigment volume concentration as a function of the pigment density.

| formulation | content of solids in % | volume concentration of pigments in % | oxidative weight loss in % |
|---|---|---|---|
| #1 | 39.0 | 28.6 | 6.4 |
| #2 | 39.6 | 29.2 | 6.4 |
| #3 | 38.0 | 29.7 | 6.8 |

All formulations contain phenol novolak resin R 108 of General Electric Co. which has a molecular weight distribution of about 300 to 2000 and gel times of about 18 to 19 min. The gel times were determined by dynamic mechanical analysis.

Also used were formulations containing EPON 2004 epoxy resin by Shell Chemical Co. which has a molecular weight of about 2000.

Constant curing parameters, 1st step

| heating rate | = | 20° C./min. |
|---|---|---|
| final temperature | = | 234° C. |
| curing time | = | 2.5 h |
| cooling rate | = | 2° C./min. |
| oxygen contents | = | 0%, 10%, 30% |

The oxygen content is determined in a DRAEGER OXIWARN 100 which is based on electrochemical oxygen detection (carbon electrode). The oxygen is determined at ambient temperature prior to each cycle. During curing, the oxygen is applied at constant speed. The entire gas contained in the drying oven is exchanged within 2 minutes.

| gas flow | 1.4 m/sec. (±0.2) |
|---|---|

Constant postcuring parameters, 2nd step

| final temperature | = | 234° C. |
|---|---|---|
| curing time | = | 20 min. and 60 min. |
| oxygen contents | = | 0%, 10% and 30% |

The coated magnetic disks #1 to 3 are initially cured for 2.5 hours at 234° C. in a drying oven atmosphere containing 0, 10 and 30% oxygen and a nitrogen remainder. Then, the magnetic disks cured without oxygen, i.e., in an atmosphere containing only nitrogen, were postcured for 20 and 60 minutes, respectively, in an atmosphere containing 0, 10 and 30% oxygen and a nitrogen remainder. Magnetic disks cured for 2.5 hours at 234° C. in an oven atmosphere containing 10 and 30% oxygen, respectively, are treated in the same way. Finally, all magnetic disks were polished under the same conditions despite the different hardness values of their coatings. The polishing time was 28 sec. and the pressure applied 4.3 bar. After polishing, a lubricant was applied to the magnetic disks. A suitable lubricant is, for example, a fluorocarbon lubricant as described in U.S. Pat. Nos. 4,267,238 and 4,268,566. The quantity of lubricant absorbed is defined as the quantity retained by the magnetic disk, which a specific wiper is incapable of removing at a specific pressure and in a given number of wipe steps of given duration.

The following table shows the absorbed lubricant quantities for coating formulation #1, as referred to the thickness of the magnetic layer, after the different curing steps. All weights of lubricant determined are based on an extraction with fluorochloro hydrocarbon (FREON by du Pont de Nemours).

| curing 234° C. duration 2.5 h | | postcuring 234° C. | | |
|---|---|---|---|---|
| $O_2$ content | | 20 min. | 60 min. | $O_2$ content |
| 0% | 17.7 | 22.0 | 18.0 | 0% |
| | | 18.8 | 30.18 | 10% |
| | | 21.5 | 36.26 | 30% |
| 10% | 16.0 | 18.97 | 17.88 | 0% |
| | | 17.6 | 16.9 | 10% |
| | | 16.8 | 18.9 | 30% |
| 30% | 21.4 | 21.1 | 18.3 | 0% |
| | | 21.7 | 19.0 | |
| | | 20.0 | 19.6 | 10% |
| | | 22.7 | 21.1 | 30% |

The values in the table show that in the case of single step curing (1st column), the different oxygen contents influence the lubricant retention only very slightly.

In a two-step curing process, the retained quantities of lubricant (in mg) may vary between about 16 and about 38, depending upon the curing cycle. Very high lubricant retention occurs when the magnetic layer is initially cured in a nitrogen atmosphere, followed by postcuring for a longer time in an atmosphere with a high oxygen content (column 3, 3rd value). This curing cycle doubles the value of lubricant retention compared to that obtainable by the single step curing process. This effect produced by two-step curing may also be achieved by single step curing if in the start and end phases curing is respectively effected in nitrogen and in an atmosphere with a high oxygen content and there is no cooling down when changing from one atmosphere to the other.

The drastic increase in lubricant retention may be explained as follows: The lubricant retention depends on the quantity and the degree of degradation of the added PVME. During the previous curing process in air the degradation of PVME and the curing of the polymer matrix occur substantially concurrently with the heating of the oven. The pore formation in the coating is attributable to phase separation of the PVME, which is produced by the incompatibility of the polymerizing resin molecules of the binder and PVME. The number of pores and the lubricant retention are the higher the more pronounced the phase separation of PVME is.

During normal curing (in air) PVME degradation starts before the resin molecules reach a high molecular weight, i.e., a large quantity of PVME is degraded before phase separation of the PVME is completed and the resin matrix is adequately cross-linked to ensure pore stability.

During curing in nitrogen (1st column, 1st value), the resin molecules reach a high molecular weight without PVME molecules being simultaneously degraded and complete phase separation occurring between the PVME and the highly molecular resin matrix. It was found that only after completion of phase separation of PVME during curing in nitrogen, curing in an atmosphere containing oxygen may be effected for such time (3rd column, 3rd value) until all of the PVME is degraded, thus ensuring the highest possible degree of porosity in the magnetic layer and the highest possible potential for lubricant retention.

Application of this two-step curing cycle, using the same quantity of PVME, practically doubles the lubricant retention or considerably reduces the quantity of PVME a magnetic disk of a particular size requires for a lubricant retention value of, say, 20 mg. This small quantity of PVME positively affects the mechanical characteristics of the magnetic layer and the glass transition temperature, since the PVME does not only act as a pore former but also influences the cross-linkage reaction of the resin molecules.

Several thermoanalytical methods have been developed by which the degree of chemical cross-linkage may be characterized. Dynamic mechanical analysis (DMA), for example, evaluates the first loss maximum considered equivalent to the glass transition temperature (Tg) of the resin. This loss maximum plotted against temperature shows that a curing time of about 2.5 h yields stable DMA values for magnetic layers of the above-mentioned table, i.e., the resin matrix of the magnetic layer is completely cross-linked. Postcuring for 20 minutes in an atmosphere with different oxygen contents scarcely changes these values. Only a longer postcuring time (60 minutes) and high oxygen contents (30%) produce a noticeable increase in the first loss maximum. The conclusion to be drawn from this is that oxidation of the magnetic layer allows further cross-linkage.

The invention has been explained with reference to coating formulations containing PVME. Other additives, such as those described in the U.S. Pat. No. 4,546,035, are, of course, equally suitable, provided they involve oxidizable materials that are insoluble in the matrix of the polymeric binder and thermally stable at the aforementioned process parameters.

What is claimed is:

1. A method of manufacturing a magnetic record carrier of the type wherein the magnetic layer on the carrier is a coating formulation of magnetic particles dispersed in a curable organic binder system and solvents or mixtures thereof and an additive, the magnetic layer being applied to a substrate and cured, the method comprising the steps of heating said magnetic layer in an inert gas for a given time to a given temperature, and thereafter heating said layer in an inert gas to which oxygen has been added, for a given time to a given temperature.

2. The method according to claim 1 further comprising the step of allowing the magnetic layer to cool between the first and second heating steps.

3. The method according to claim 1 wherein the second heating step comprises adding oxygen to the the same inert gas in which the magnetic layer was heated in the first heating step.

4. The method according to claim 1 wherein the first heating step is carried out in an inert gas selected from the group consisting of nitrogen, noble gases and $CO_2$.

5. The method according to claim 1 wherein the second heating step is carried out in an inert gas with the addition of 0 to about 30 vol % oxygen.

6. The method according to claim 1 wherein the first heating step is carried out for a time of about 1.5 to 3 hours.

7. The method according to claim 1 wherein the second heating step is carried out for a time of about 60 to 120 minutes.

8. The method according to claim 1 wherein the first and second heating steps are carried out at a temperature of about 210° C. to 245° C.

9. The method according to claim 1 wherein one of the additives in the magnetic layer is an oxidizable substance which is insoluble in the matrix of the binder system and thermally stable.

10. The method according to claim 1 wherein one of the additives is polyvinylmethylether (PVME).

11. The method according to claim 1 further comprising the step of after the magnetic layer is cured applying a lubricant containing fluorocarbon to the cured magnetic layer.

* * * * *